(12) United States Patent
Tong

(10) Patent No.: US 6,504,273 B2
(45) Date of Patent: Jan. 7, 2003

(54) ADJUSTABLE SPACE BLOCK BAFFLE FOR GENERATOR AND METHOD FOR CONTROLLING VENTILATION FLOW

(75) Inventor: Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/841,190

(22) Filed: Apr. 25, 2001

(65) Prior Publication Data

US 2002/0158522 A1 Oct. 31, 2002

(51) Int. Cl.⁷ .............................................. H02K 9/00
(52) U.S. Cl. ........................................................ 310/58
(58) Field of Search .............................. 310/51, 58, 53

(56) References Cited

U.S. PATENT DOCUMENTS

| | | | |
|---|---|---|---|
| 3,969,643 A | * | 7/1976 | Sapper ........................ 310/53 |
| 4,051,399 A | * | 9/1977 | Stanwick et al. ............ 310/258 |
| 4,051,400 A | | 9/1977 | Armor et al. ................. 310/58 |
| 4,315,173 A | * | 2/1982 | Calfo et al. .................. 310/260 |
| 4,324,993 A | * | 4/1982 | Sato et al. ................... 310/208 |
| 4,383,191 A | * | 5/1983 | Mizuyama et al. ......... 310/269 |
| 4,609,840 A | | 9/1986 | Eats et al. ..................... 310/58 |
| 4,682,064 A | | 7/1987 | Crounse et al. ............... 310/61 |
| 4,922,147 A | * | 5/1990 | Sismour et al. ............... 310/53 |
| 5,652,469 A | * | 7/1997 | Boardman et al. ............ 310/58 |
| 5,757,094 A | * | 5/1998 | van Duyn .................... 310/157 |
| 6,188,153 B1 | * | 2/2001 | Hokanson ..................... 310/52 |
| 6,268,668 B1 | | 7/2001 | Jarczynski et al. ........... 310/52 |

\* cited by examiner

Primary Examiner—Joseph Waks
(74) Attorney, Agent, or Firm—Nixon & Vanderhye PC

(57) ABSTRACT

A baffle structure that has a generally curved surface profile so that ventilation windage loss can be significantly reduced is provided. In an exemplary embodiment, the orientation and/or the height of the baffle can be adjusted to adjust flow gaps defined between it and the adjacent lamination/stator flange surfaces and/or between it and a facing adjacent space block, so that ventilation flow can be controlled to satisfy varying cooling requirements.

24 Claims, 8 Drawing Sheets

ADJUSTABLE SPACE BLOCK BAFFLE FOR GENERATOR AND METHOD FOR CONTROLLING VENTILATION FLOW

BACKGROUND OF THE INVENTION

The present invention relates to generator cooling and, more particularly, to a space block baffle structure for the better control of ventilation flow between space blocks and for the reduction of ventilation windage loss.

During the process of producing electricity, power generators also create heat that must be dissipated away from the generator. Generators are typically gas-cooled by ventilated cooling systems that circulate cooling gas through ducts in the rotor and stator.

By way of example, FIG. 1 shows a cross-section of one-quarter of a generator 10 (see axial centerline 12 and longitudinal centerline 14). In this example, a portion 16 of the flow of cooling gases is directed to the rotor 18. The cooling gases are drawn through ventilation ducts 20 in the rotor by centrifugal forces created by the spinning rotor 18. As the gases flow through the rotor, heat in the rotor is transferred to the gases. The thus heated gases exit the rotor ducts at the surface of the rotor and enter into an annular air gap 22 between the rotor 18 and stator 24. Fans 26 mounted at the ends of the rotor (only one of which is shown in FIG. 1) drive the gas flow through the annular gap 22.

The stator 24 is also cooled by ventilation flows. More specifically, the generator stator core is constructed by stacking many layers of magnetic laminations 28. Ventilating ducts 30 are defined between the stacked layers of magnetic laminations by providing spacers in the core stack. This allows for the passage of cooling gas through the core during operation. These spacers must be positioned in such a way to assure tightness of the core during assembly and operation, but must not block or restrict the flow of gas through the stator. The outside space blocks 32 are located at the ends of the generator stator core, between the stacked laminations and the stator flange 34, as schematically shown in FIG. 1.

As can be seen in the structure illustrated in FIG. 1, the cooling gas flow from the ventilating fan 26 splits into four branches: the rotor-stator gap flow 36, rotor subslot flow 16 (as mentioned above), outside space block flow 38, and endwinding flow 40. The flows ultimately converge to flow through heat exchangers 42 provided about the periphery of the stator. Baffles 44 on the outside space blocks are used to control the ventilation flow 38 under the flange 34 and thus the ventilation flow 40 over the face of the flange. (FIG. 2) By setting appropriate gaps between the baffle 44 and the adjacent, facing space block wall, and between the baffle and the lamination/stator flange surfaces, the ventilation flow 38 through the outside space blocks can be controlled to gain uniform temperature distribution at the ends of the stator core.

As shown in FIG. 3, outside space block baffles 44 are conventionally made from L-shaped stainless steel beams and mounted on the sides of the space blocks 32 so that three flow gaps are formed. A first flow gap is defined between the baffle structure 44 and the adjacent, facing space block wall 46 and two further flow gaps are defined between the baffle 44 and the respectively adjacent surfaces of the lamination 28 and stator flange 34.

With this type of baffle, there are several disadvantages. First, the baffle 44 is not adjustable. Therefore, the cooling flow rate through the space block is predetermined and cannot be altered. As a result, a particular baffle will work well only for one generator type. Second, as the cooling gas passes through these gaps, it generates large flow recirculation due to the sudden expansion of the flow area, resulting in high windage loss.

BRIEF SUMMARY OF THE INVENTION

In view of the problems and inefficiencies observed with the traditional space block baffle structure, a baffle having a generally curved surface profile and/or a baffle that is adjustable to enable modification of the flow gaps would be highly desirable.

The invention is embodied in a baffle structure that has a generally curved surface profile so that ventilation windage loss can be significantly reduced. The invention may be further embodied in a baffle that can be adjusted to adjust the flow gaps defined between it and the adjacent lamination/stator flange surfaces and/or between it and the adjacent space block wall, so that the ventilation flow can be controlled to satisfy varying cooling requirements. Although embodiments of the invention are described herein with reference to the outside space blocks, it is to be understood that baffles embodying the invention could be mounted to any space block in the generator structure for controlling cooling air flow. Therefore, the invention is not limited to baffles for the outer space block/stator flange assembly.

Thus the invention is embodied in a baffle structure for defining at least one flow gap through a flow passage defined between mutually adjacent space blocks disposed between mutually adjacent stacked generator components, the baffle structure comprising: a main body that has a generally curved outer peripheral edge; and a fastening assembly for fastening a center of the base wall to a space block.

In an exemplary embodiment, the main body is elliptically shaped in cross-section so that a rotational position of the baffle structure determines a size of the at least one flow gap.

In one embodiment, the main body of the baffle structure comprises: a base wall and a generally curved side wall projecting from an outer peripheral edge of the base wall. In a second embodiment, the main body of the baffle structure comprises an upper part and a lower, base part. To provide a height adjustable assembly, in an exemplary embodiment, mutually engaging surfaces of the upper and lower parts are inclined to a radial axis of the flow passage so that shifting the upper part with respect to the lower part adjusts a height of the baffle structure. To properly align the parts and maintain a selected height, the mutually engaging surfaces each comprise a plurality of grooves.

The invention is also embodied in an electromagnetic generator comprising: a stator structure concentrically disposed to a rotor structure, the stator structure having a radially outer surface and a radially inner surface, and including stacked laminations and an end flange component mounted to at least one axial end of the stacked laminations; a plurality of space blocks mounted between the stacked laminations and the end flange, the space blocks being circumferentially spaced and extending radially to define a plurality of radial flow passages therebetween; and a baffle structure disposed in a the flow passage and secured to a first the space block for defining first and second air flow gaps respectively between the baffle structure and the end flange and between the baffle structure and the stacked laminations, the baffle having a generally curved peripheral surface for directing air flowing through the flow passage to and through the first and second air flow gaps.

In an exemplary embodiment, the baffle structure is elliptically shaped and secured to the space block with a single fastening assembly disposed at a center thereof so that rotation of the baffle structure with respect to the fastening assembly varies the first and second flow gaps.

The invention is even further embodied in a method for controlling ventilation flow in a generator comprising: providing a baffle structure; securing the baffle structure to a space block defining, with a space block facing thereto, a flow passage between stacked laminations and an end flange component of a stator structure, the baffle structure having a generally curved peripheral surface for directing radially flowing air to flow path to first and second air flow gaps defined respectively between the stacked laminations and the baffle structure and the end flange and the baffle structure; and rotating the baffle structure with respect to the space block to determine a size of each of the first and second air flow gaps thereby to control ventilation flow along the flow path. In one embodiment, the baffle structure has upper and lower parts engaged at mutually inclined surfaces, and the method further comprises shifting at least one of the upper and lower parts so as to alter a height of the baffle structure to determine a size of a third air flow gap between the baffle structure and the facing space block.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
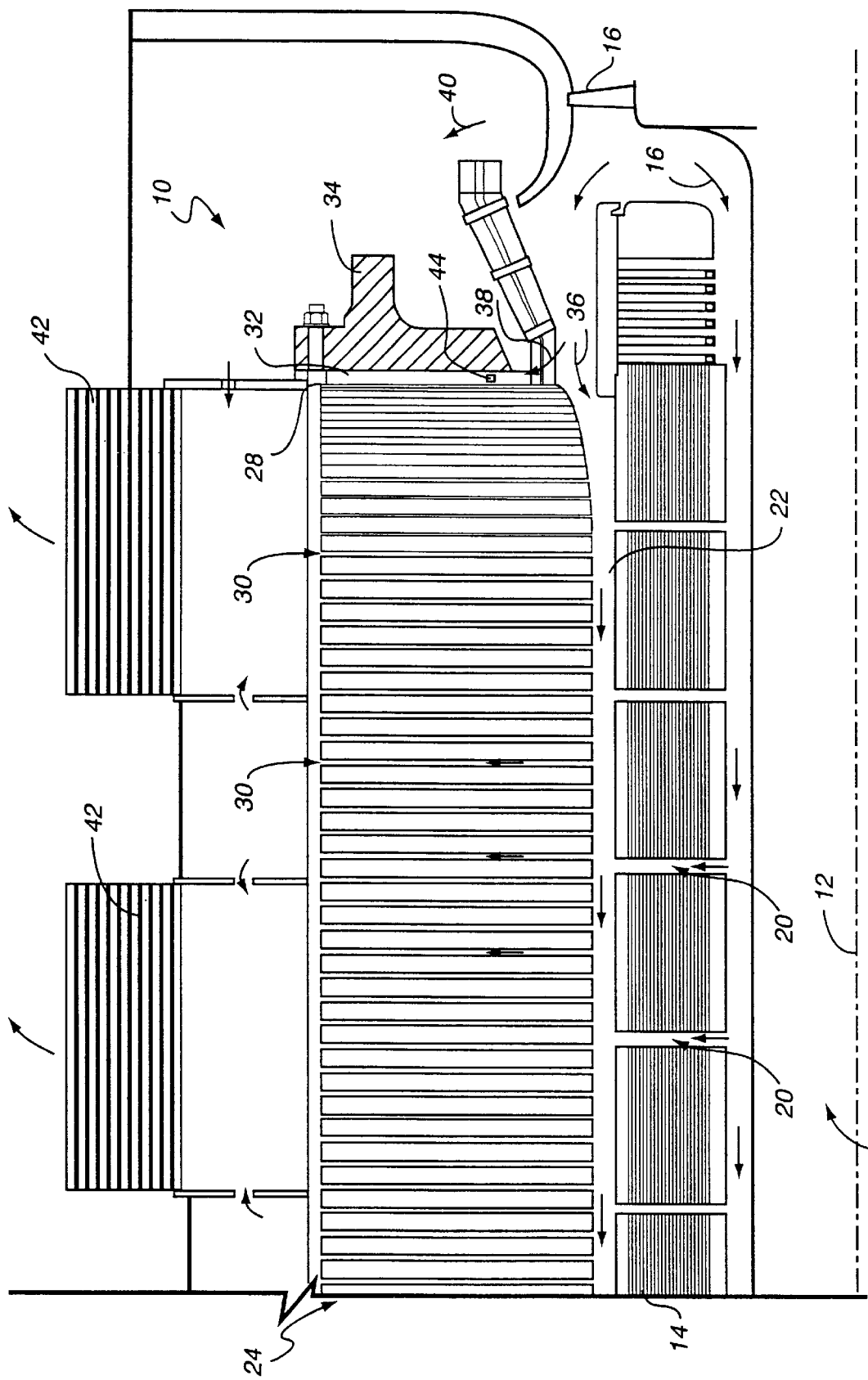
FIG. 1 is a schematic cross-sectional view of a generator showing a conventional cooling system.
Figure 2:
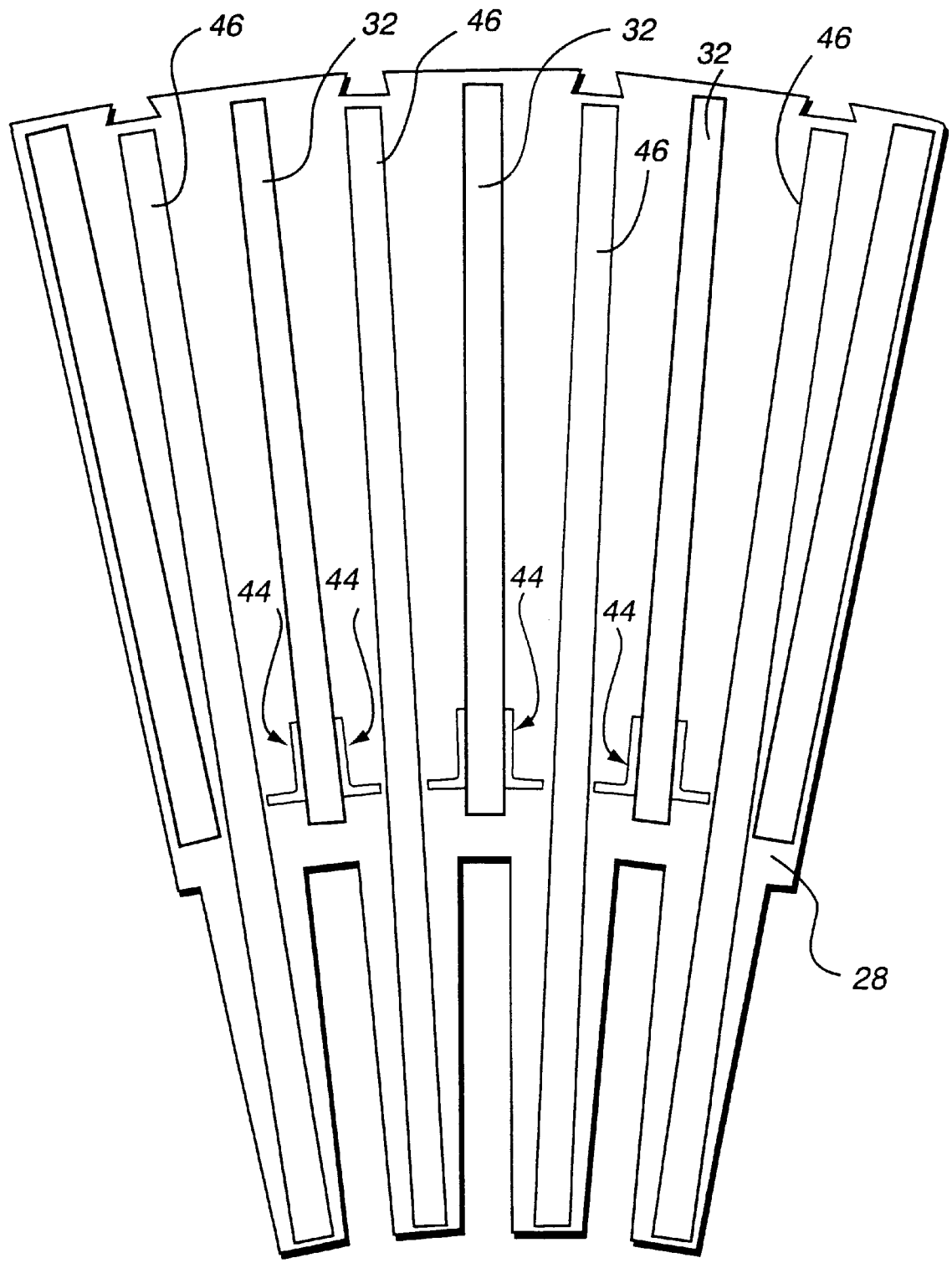
FIG. 2 is a sectional view of outside space blocks with conventional baffles.
Figure 3:
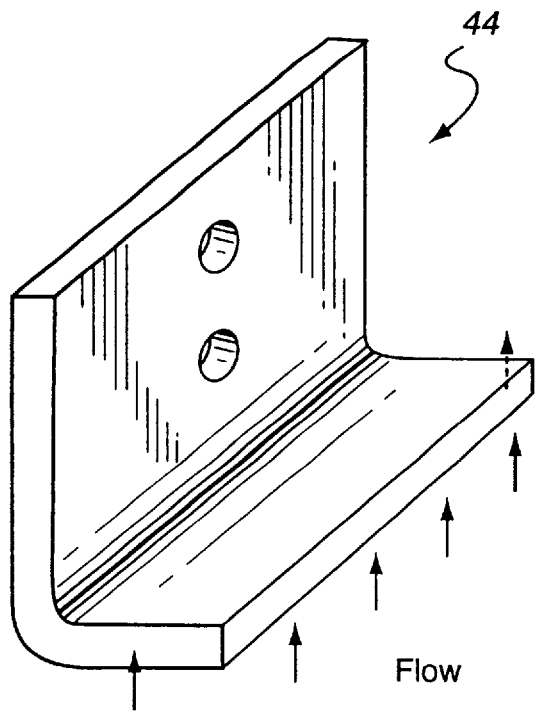
FIG. 3 is a schematic perspective view of a conventional space block baffle.
Figure 4:
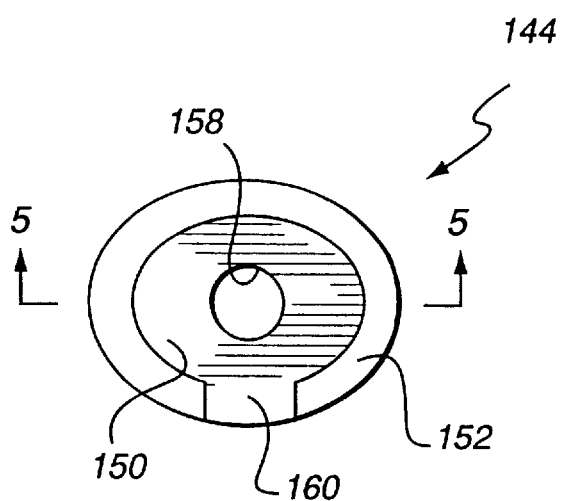
FIG. 4 is an elevational view of a first space block baffle embodying the invention.
Figure 5:
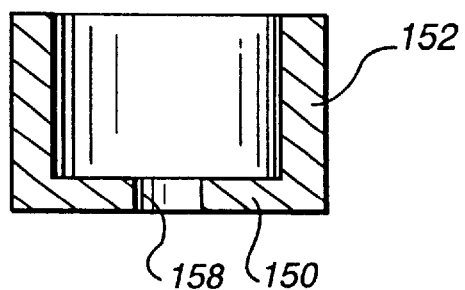
FIG. 5 is a cross-sectional view taken along line 5—5 of FIG. 4.

Space block baffle configurations are proposed to overcome the disadvantages of conventional baffle designs. A first feature desirably provided by the invention is a baffle structure that has a generally curved surface profile so that ventilation windage loss can be reduced. A generally curved surface profile can be provided by a baffle structure that is generally circular or elliptical in plan and has either a continuously curved surface or a surface defined by a plurality of flat faces such as a hexagon or octagon to define a generally curved surface profile particularly as compared to the planar flow intercept defined by the conventional baffle structure 44. In the illustrated embodiments, discussed in greater detail below, the baffle structure 144, 244 has a continuously curved surface to define a smooth surface profile.

While a generally curved surface profile to reduce ventilation windage loss may be provided with a baffle having a generally circular profile, a further advantageous feature of the invention is to provide for adjustability of the flow gaps defined between the baffle and the adjacent lamination 128 and/or stator flange 134 surfaces. Therefore, in an exemplary embodiment, the ventilation baffle structure has a generally elliptical shape so that a flow gap formed between the baffle and the mutually adjacent surfaces can be determined by the disposition and/or orientation of the baffle, as described in greater detail below.

In one embodiment, the baffle structure has a main body that is generally elliptically shaped in cross-section, comprised of a base wall 150 and an upstanding continuously curved side wall 152 disposed perpendicular to the base wall 150. The main body of the baffle structure 144 is mounted to its respective space block 132 with at least one fastening assembly 153. In the illustrated embodiment, the baffle is secured at a center thereof to the space block. Mounting the baffle structure with a single, central fastener allows the flow gap formed between the baffle and the lamination/flange surfaces to be adjusted by rotating the baffle about its axis and then fixing the fastening assembly to lock the baffle in place.

Figure 6:
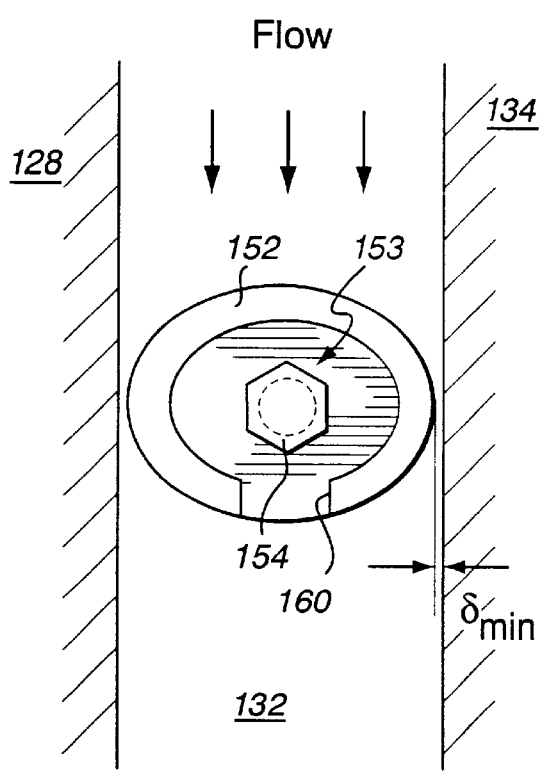
FIG. 6 is a view similar to FIG. 4, showing a baffle according to the first embodiment of the invention mounted to a space block and disposed between mutually adjacent lamination/stator flange surfaces.
Figure 7:
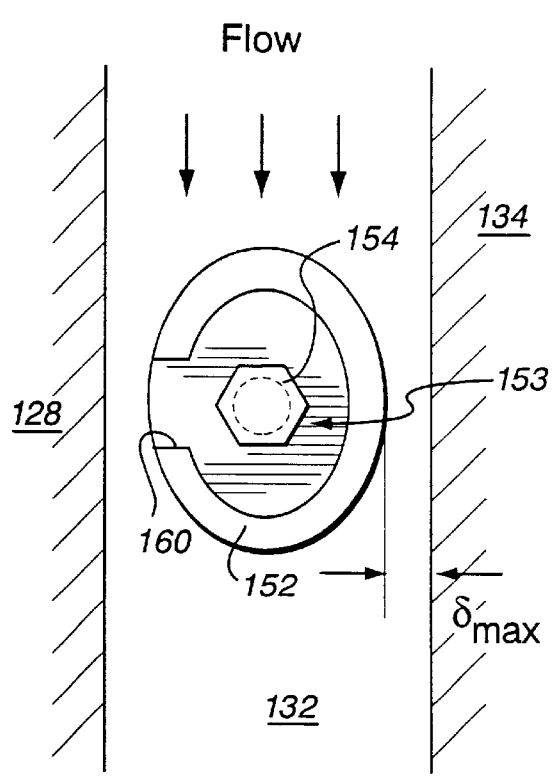
FIG. 7 is a view similar to FIG. 6 showing the baffle according to the first embodiment oriented to increase a flow gap with adjacent lamination/stator flange surfaces.

More specifically, as illustrated in FIG. 6, if the long or major axis of the baffle 144 is oriented generally perpendicular to the longitudinal axis of the space block 132, the flow gap $\delta$ between the generally elliptical baffle and the respective lamination surfaces is at its smallest, $\delta_{min}$. As the baffle 144 is rotated through 90 degrees to be oriented with its major axis generally parallel to the longitudinal axis of the space block 132, the gap $\delta$ with the adjacent lamination/flange becomes greatest, $\delta_{max}$, as shown in FIG. 7. Thus, by centrally mounting a generally elliptical baffle, the flow gaps between the baffle and the respective lamination/stator flange surface are adjusted by setting the rotational position of baffle 144 relative to the space block 132. By suitably selecting the dimensions of each of the long and short axes of the ellipse, the baffle can control the flow rate through a wide range, and as a consequence, satisfy different cooling requirements.

Figure 8:
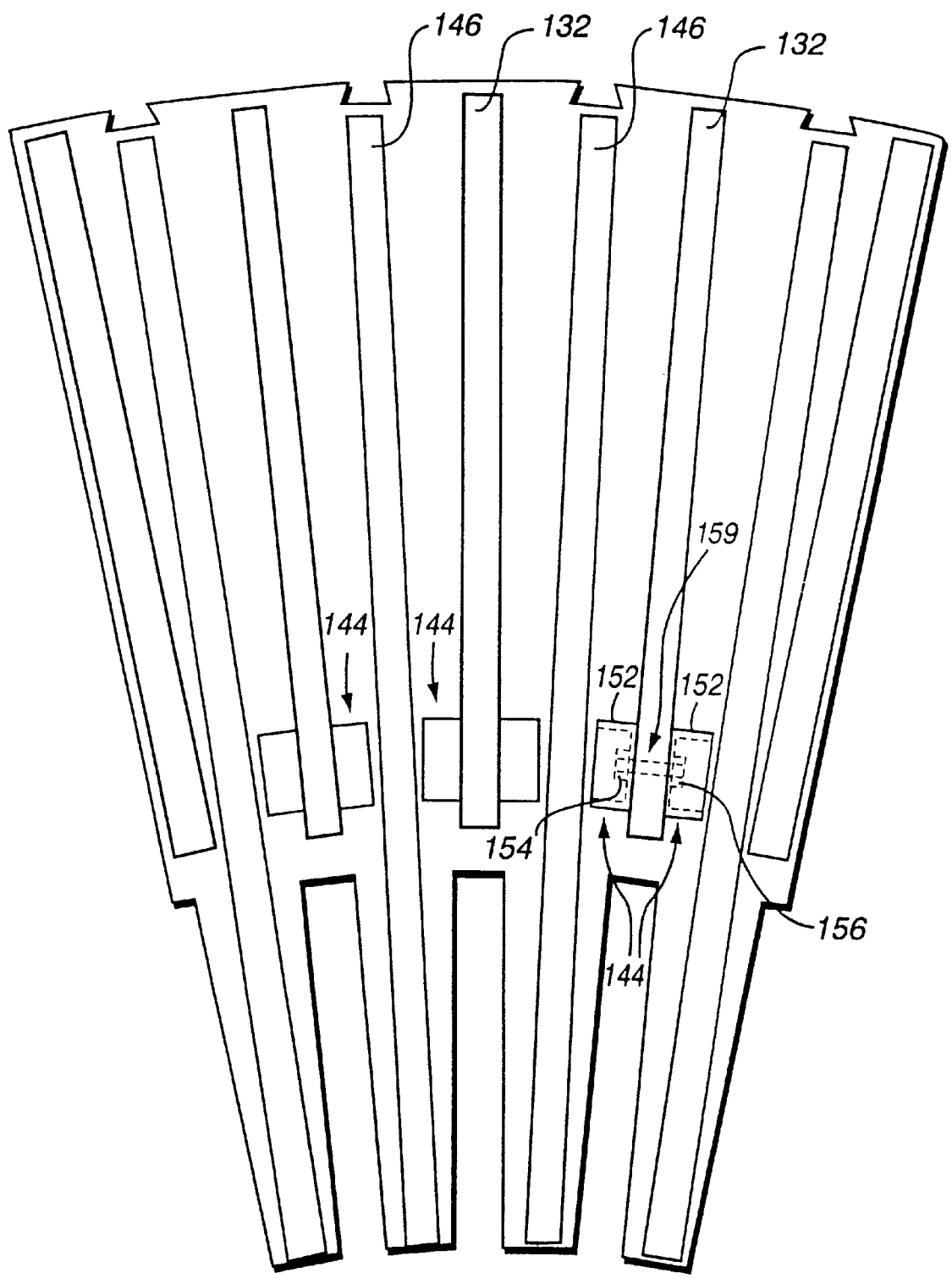
FIG. 8 is a sectional view of outside space blocks with baffles according to the first embodiment of the invention.

An assembly of space blocks and baffles according to the embodiment of FIGS. 4–7 is shown in FIG. 8. As illustrated, an exemplary fastening assembly 153 for baffle 144 is a bolt 154 and nut 156 assembly. With such a fastener, the bolt 154 can be passed through a hole 158 in the base 150 of one baffle 144, through a fastening assembly bore 159 the space block 132, through a hole in the base of another baffle, and secured with the nut 156. A bolt installation groove or cut out 160 is advantageously defined in the upstanding side wall 152 to provide access to the fastening assembly 153.

As will be appreciated from the foregoing, providing a generally continuously curved baffle side wall, as with a generally elliptical baffle structure, provides for a generally continuous transition between maximum and minimum flow gaps as the elliptical baffle is rotated through 90 degrees. The generally curved surface profile may be defined in the alternative, as noted above, by a series of generally flat surfaces. Although such a surface may be considered a generally curved surface profile for purposes of reducing ventilation windage loss, the flow gap adjustment provided by an elliptical baffle having a plurality of flat surfaces would be a generally stepped adjustment, with each step generally corresponding to the disposition of a respective flat face of the baffle in parallel facing relation to a respective lamination/flange surface.

As noted above, a generally elliptically shaped block achieves not only a smooth surface profile so that ventilation windage loss can be significantly reduced, but also provides ventilation flow adjustability.

Indeed, by providing a baffle as illustrated in FIGS. 4–8, the flow rate at each flow channel can be controlled individually by determining the particular shape of each respective baffle and/or by determining an orientation of each baffle with respect to the mutually adjacent lamination/stator flange surfaces. Therefore, adjacent cooling flow channels may have a baffle disposed therein that has a differing configuration, i.e. size and/or shape, and/or a differing orientation with respect to its respective space block, thereby to define differing cooling characteristics and, thus, satisfy differing cooling requirements. Accordingly, the flow rate through each flow channel can be controlled individually to gain a best cooling effect.

The baffle configuration schematically shown in FIGS. 4–8 controls the gaps between the baffle and its adjacent lamination surfaces. However, with this embodiment, the gap between the baffle 144 and the facing space block wall 146 is not adjustable per se. Therefore, in general this type of baffle would be characterized as a two-dimensional adjustable baffle. According to a further feature of the invention, however, it would be desirable to also selectively modify a flow gap between the baffle 144, 244 and the adjacent space block 146, 246.

Adjustment of the flow gap with a mutually adjacent space block may be accomplished by disposing one or more spacers, such as a washer structure (not shown, but desirably generally corresponding in shape to the bottom wall 150 of the baffle) between the respective space block 132 and the baffle 144, to thereby lift the baffle and reduce a ventilation flow gap between the baffle 144 and the space block 146 facing thereto. It would further be desirable, however, to provide a three-dimensionally adjustable baffle structure so that the flow gap between the baffle and the space block facing thereto can be adjusted without the provision of a spacer.

Figure 9:
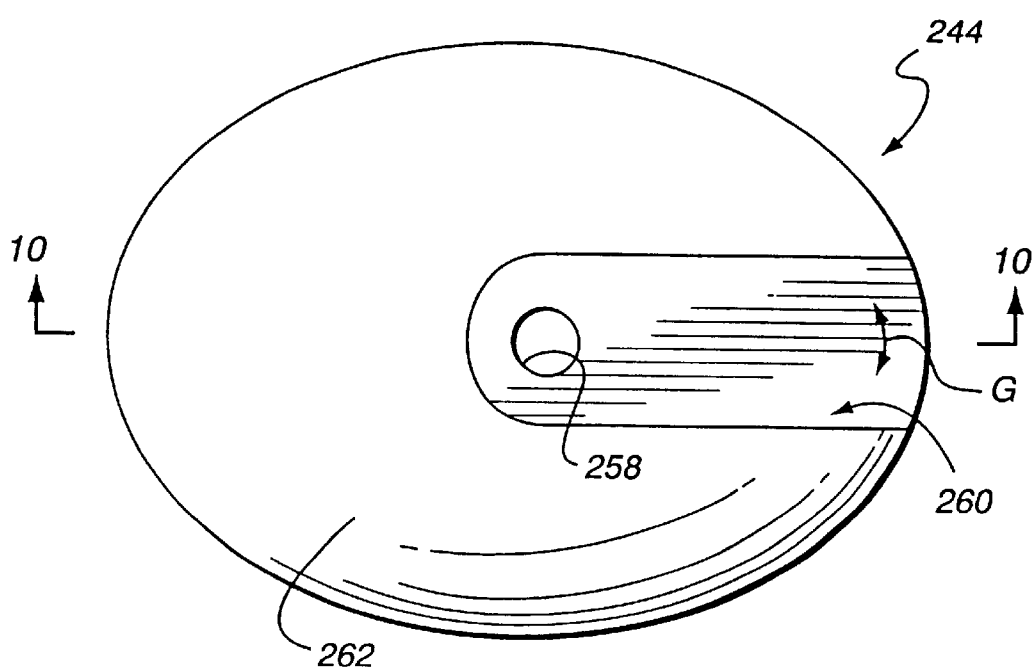
FIG. 9 is an elevational view of a second space block baffle embodying the invention.
Figure 10:
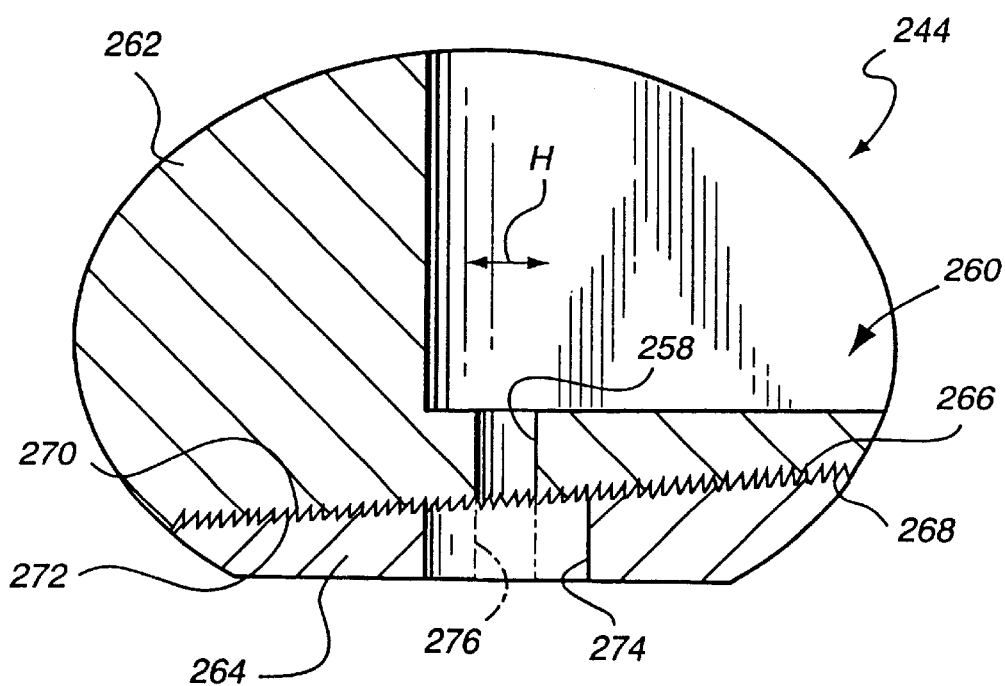
FIG. 10 is a cross-sectional view taken along line 10—10 of FIG. 9.
Figure 11:
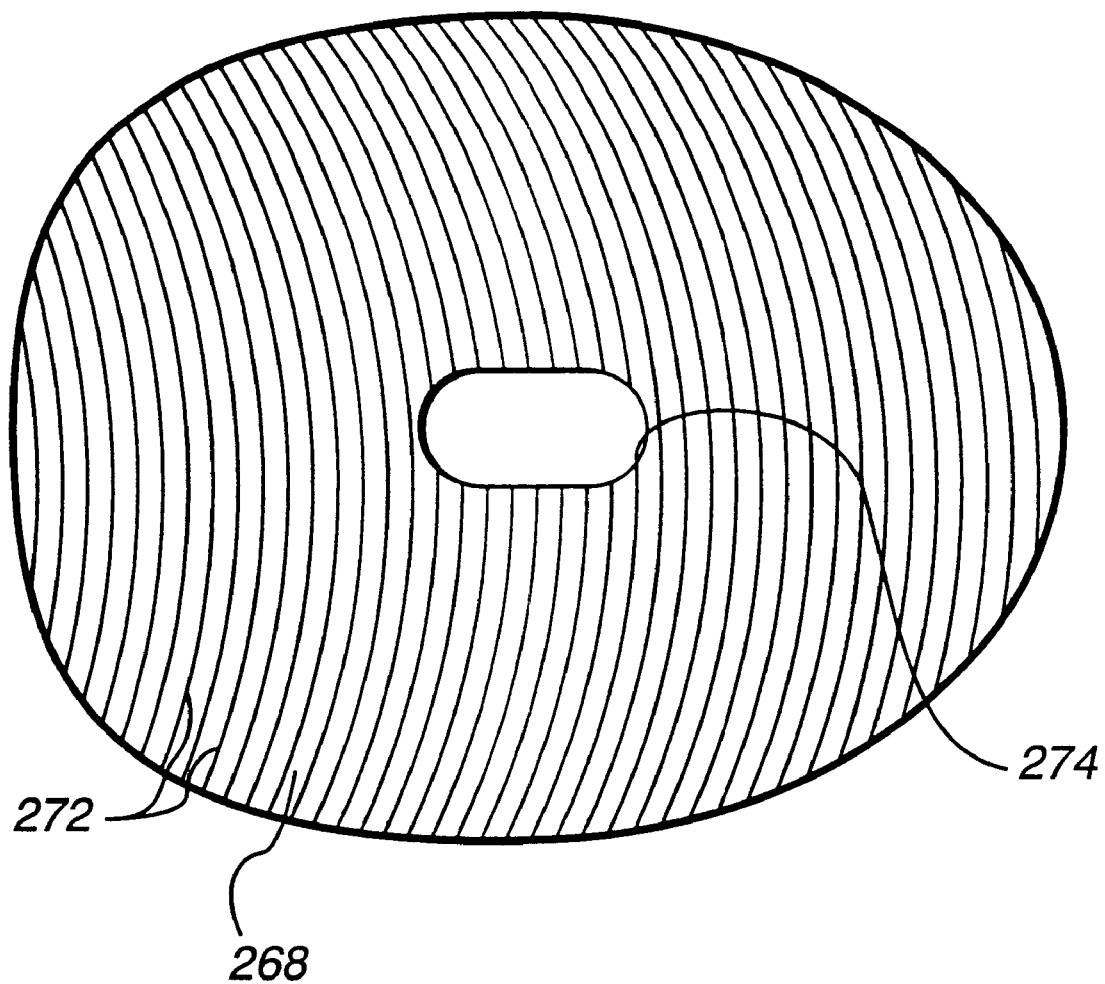
FIG. 11 is an elevational view of a lower, base portion of the baffle illustrated in FIGS. 9–10.
Figure 12:
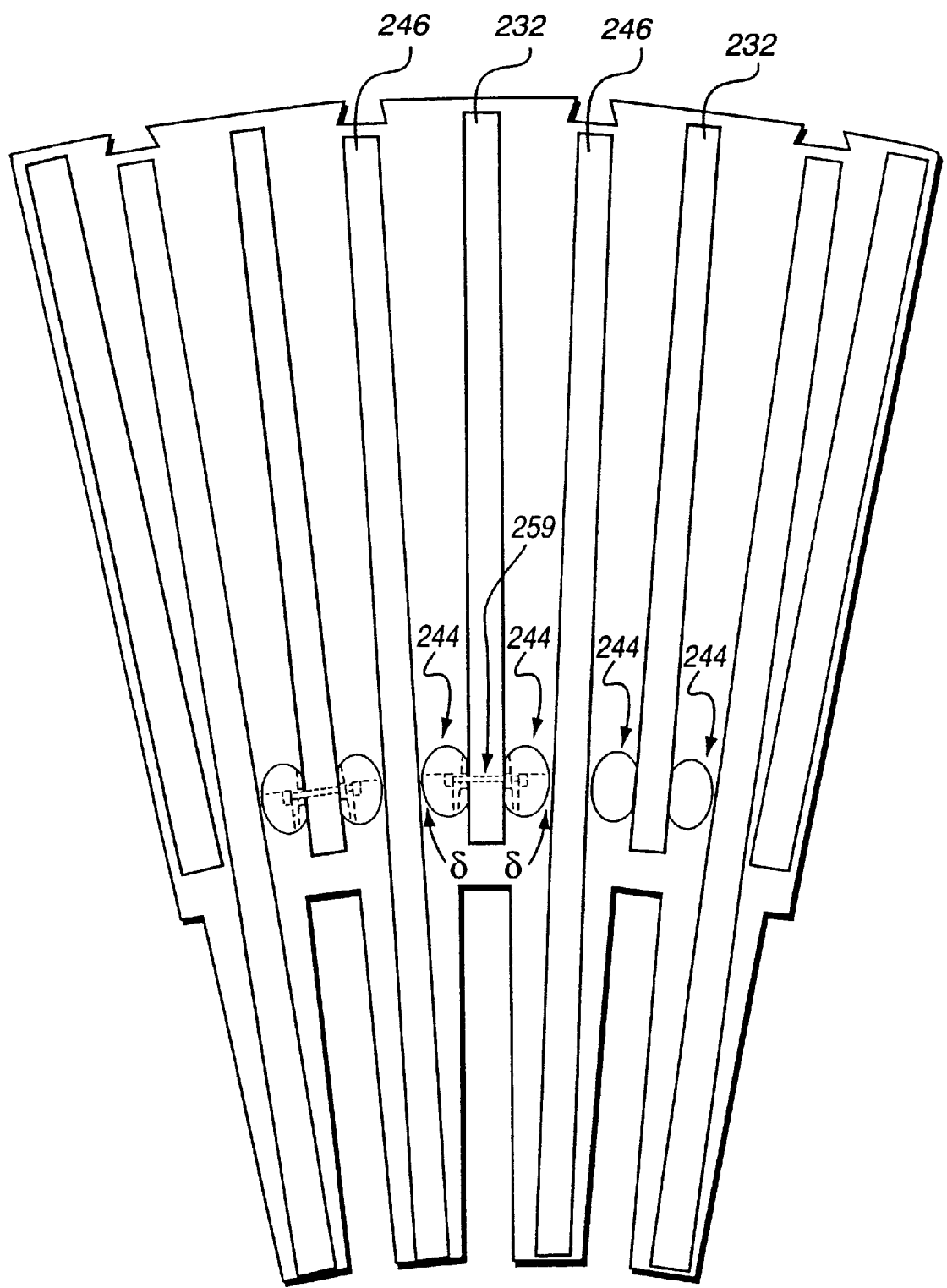
FIG. 12 is a sectional view of outside space blocks with baffles according to the second embodiment of the invention.

An exemplary three-dimensional adjustable baffle 244 is illustrated in FIGS. 9–11. In this embodiment, the baffle has a main body that is generally elliptically shaped in cross-section, and is comprised of two main parts, an upper part 262 and a lower or base part 264. As can be seen from FIG. 10, the parts 262, 264 define a generally inclined mating surface therebetween so that as the parts are shifted relative to one another, in the direction of arrow H, a total height (in a circumferential direction of the stator) of the respective baffle structure is increased or reduced thereby to decrease or increase the flow gap $\delta_H$ with the adjacent space block 246 (FIG. 12). In an exemplary embodiment, the contact surfaces 266, 268 of each of the upper and lower parts 262, 264 has a number of small, complementary grooves 270, 272 defined therein with identical radii. The complementary grooves ensure that the parts 262, 264 are properly directionally oriented on assembly, and that the parts will not slip in the direction of arrow H once a baffle height has been determined.

In the illustrated embodiment, the main body of the baffle structure 244 is secured to the space block with a single fastening assembly 253. Accordingly, a fastening assembly bore 258 and an installation groove or cutout 260 are defined in the baffle upper part 262 and a fastening assembly receiving slot 274 is defined in the lower part 264. Also, the lower part has a maximum diametrical dimension less than the maximum diametrical dimension of the upper part. The slot in the lower part ensures that a fastening assembly path, shown in phantom at 276, will be defined through the baffle assembly, even when the upper and lower parts are shifted to alter the total height of the baffle structure. In an exemplary embodiment, the upper part 262 is preferably maintained centered with respect to the fastening assembly bore 259 of the space block 232 and it is the lower part 264 that is shifted, e.g., longitudinally, in direction H to adjust the total height of the baffle structure. The lesser dimension of the lower part ensures that even the height adjusted baffle structure 244 can be rotated in direction G about its central axis, in a manner analogous the embodiment of FIGS. 4–8, to adjust flow gaps $\delta$ between the baffle side wall and the lamination/stator flange surfaces, without the upper or lower parts 262, 264 abutting those surfaces.

Three-dimensional adjustability of the type illustrated in FIGS. 9–10 may be provided as well by a generally circular baffle structure. However, providing an ellipsoid baffle as illustrated provides for the further adjustment of the flow gaps $\delta$ with the respectively adjacent surfaces.

While mutually inclined surfaces having complementary grooves are illustrated in FIG. 11, it is to be understood that other height adjustment mechanisms may be provided as embodiments of the invention. For example, the mutually engaged surfaces can be stepped rather than continuously inclined, or the upper and lower parts could be defined as a telescoping assembly that is vertically adjust able Other height adjustment mechanisms and structures may be adopted in the alternative .

As will be appreciated, with a baffle embodying the invention, hot spots in the stator core can be reduced or eliminated and consequently generator operation reliability is enhanced. Moreover, the baffle may be adapted to many different generator types. Thus, baffle design and manufacturing cycle time can be greatly reduced.

The baffles embodying the invention can be made by molding with non-metallic materials, such as epoxy resin, fiberglass, and the like and therefore can also reduce the material and labor costs. Baffle weight may also be reduced by fabricating the baffle from such alternative materials.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electromagnetic generator comprising:
    a stator structure concentrically disposed to a rotor structure, said stator structure having a radially outer surface and a radially inner surface, and including stacked laminations and an end flange component mounted to at least one axial end of said stacked laminations;

a plurality of space blocks mounted between said end flange and said stacked laminations, said space blocks being circumferentially spaced and extending radially to define a plurality of radial flow passages therebetween; and a baffle structure secured to a first said space block and disposed in the respective flow passage for defining first and second air flow gaps respectively between said baffle structure and said end flange and between said baffle structure and said stacked laminations, said baffle having a generally curved peripheral surface for directing air flowing through said flow passage to and through said first and second air flow gaps.

2. An electromagnetic generator as in claim 1, wherein said baffle structure comprises a base wall secured to said space block and a generally curved side wall disposed perpendicular to said base wall and extending from a peripheral edge of said base wall.

3. An electromagnetic generator as in claim 2, wherein said base wall is generally elliptically shaped.

4. An electromagnetic generator as in claim 2, wherein said side wall is continuously curved.

5. An electromagnetic generator as in claim 1, wherein said baffle structure is secured to said space block with a single fastening assembly disposed at a center thereof.

6. An electromagnetic generator as in claim 5, wherein said baffle structure is selectively rotatable about an axis defined by said fastening assembly and said baffle structure is generally elliptically shaped so as to have a major axis and a minor axis whereby rotation of said baffle structure with respect to said fastening assembly varies said first and second flow gaps.

7. An electromagnetic generator as in claim 1, wherein said baffle structure is generally elliptically shaped in cross-section, whereby a size of said flow gaps can be selectively determined by a rotary position of said baffle structure.

8. An electromagnetic generator as in claim 1, further comprising means for adjusting a circumferential height of said baffle structure to selectively change a third gap defined between said baffle structure and a second space block facing said first space block.

9. An electromagnetic generator as in claim 1, wherein said baffle structure comprises upper and lower parts.

10. An electromagnetic generator as in claim 9, wherein mutually engaging surfaces of said upper and lower parts are inclined to a radial axis of said flow passage so that shifting said upper part with respect to said lower part adjusts a height of said baffle structure.

11. An electromagnetic generator as in claim 10, wherein said mutually engaging surfaces each comprise a plurality of grooves.

12. A baffle structure for defining at least one flow gap through a flow passage defined between mutually adjacent space blocks disposed between mutually adjacent stacked generator components, said baffle structure comprising:

a main body that has a generally curved outer peripheral edge; and a fastening assembly for fastening a center of said main body to one of said space blocks.

13. A baffle structure as in claim 12, wherein the main body is elliptically shaped in cross-section so that a rotational position of the baffle structure determines a size of the at least one flow gap.

14. A baffle structure as in claim 12, wherein said main body comprises:

a base wall; and a generally curved side wall projecting from an outer peripheral edge of said base wall.

15. A baffle structure as in claim 14, further comprising a cut-out in said side wall for providing selective access to said fastening assembly.

16. A baffle structure as in claim 14, wherein said base wall is generally elliptically shaped.

17. A baffle structure as in claim 14, wherein said side wall is continuously curved.

18. A baffle structure as in claim 12, wherein said main body comprises an upper part and a lower, base part.

19. A baffle structure as in claim 18, wherein said upper and lower parts are each generally elliptically shaped in cross-section.

20. A baffle structure as in claim 18, further comprising a cut-out in said upper part for providing selective access to said fastening assembly.

21. A baffle structure as in claim 18, wherein mutually engaging surfaces of said upper and lower parts are inclined to a radial axis of said flow passage so that shifting said upper part with respect to said lower part adjusts a height of said baffle structure.

22. A baffle structure as in claim 21, wherein said mutually engaging surfaces each comprise a plurality of grooves.

23. A method for controlling ventilation flow in a generator comprising:

providing a baffle structure;

securing said baffle structure to a space block defining, with a space block facing thereto, a flow passage between stacked laminations and an end flange component of a stator structure, the baffle structure having a generally curved peripheral surface for directing radially flowing air to flow path to first and second air flow gaps defined respectively between said stacked laminations and said baffle structure and said end flange and said baffle structure; and rotating said baffle structure with respect to said space block to determine a size of each of said first and second air flow gaps thereby to control ventilation flow along said flow path.

24. A method for controlling ventilation flow as in claim 23, wherein said step of providing a baffle structure comprises providing a baffle structure having upper and lower parts engaged at mutually inclined surfaces, and further comprising shifting at least one of said upper and lower parts so as to alter a height of the baffle structure to determine a size of a third air flow gap between said baffle structure and said facing space block.

* * * * *